Oct. 4, 1966  P. E. JOHNSON  3,276,429
INSERT FOR FARROWING CRATE
Filed Jan. 18, 1965  2 Sheets-Sheet 1

INVENTOR.
Paul E. Johnson
BY
Hovey, Schmidt, Johnson & Hovey,
ATTORNEYS.

Oct. 4, 1966
P. E. JOHNSON
3,276,429
INSERT FOR FARROWING CRATE
Filed Jan. 18, 1965
2 Sheets-Sheet 2
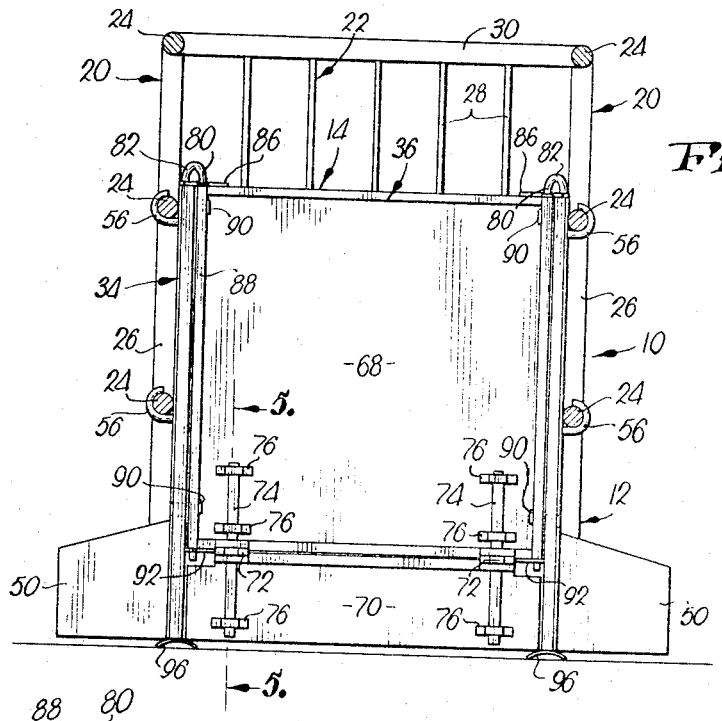
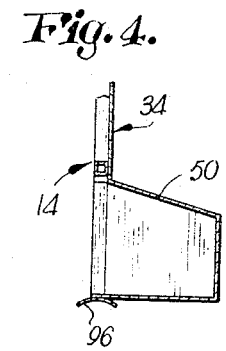
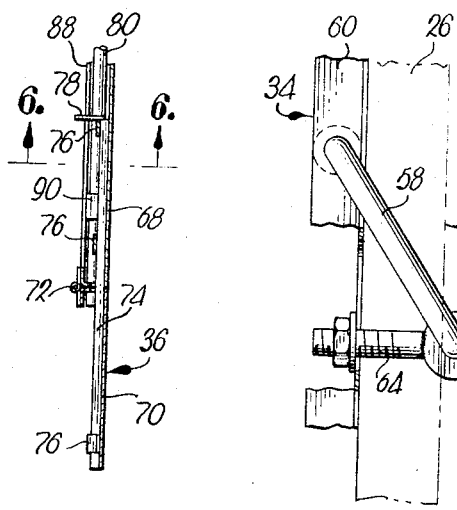
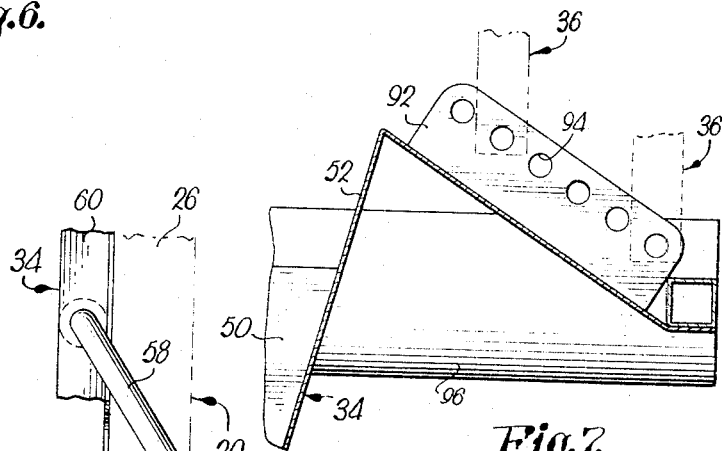
INVENTOR.
Paul E. Johnson
BY
Hovey, Schmidt, Johnson & Hovey
ATTORNEYS.

United States Patent Office 3,276,429
Patented Oct. 4, 1966

3,276,429
INSERT FOR FARROWING CRATE
Paul E. Johnson, Chenoa, Ill.
Filed Jan. 18, 1965, Ser. No. 426,037
13 Claims. (Cl. 119—20)

This invention relates to animal-confining apparatus and, more particularly, to improvements in farrowing crates.

Farrowing crates, which have been used for many years, still present problems for nursing pigs during the first few weeks after their birth because of the hazards to which the pigs are subjected by virtue of the presence of their nursing sows. Conventional farrowing crates generally permit the small, young nursing pigs to enter the space occupied by their sow so that the pigs will be assured of access to the udders of the sow during the nursing period. The loss of small pigs due to injuries inflicted by the sow is relatively high, it being estimated that at least one-quarter of the total of all pigs farrowed alive do not live beyond the weaning stage due to their being crushed by the sow itself. Also, the sow may well be the source of loss due to disease as a result of unsanitary conditions in and around the farrowing crate. It is, therefore, evident that the need for improvements in farrowing crates presently exists if the high mortality rate of young pigs due to disease and fatal injuries is to be significantly reduced.

The present invention provides improvements in farrowing crates which serve to minimize the risks to the lives of nursing pigs presented by conventional farrowing crates. In this respect, the instant invention relates to apparatus for use with such a crate in a manner so as to prevent entrance of nursing pigs into the space in which the sow is confined while, at the same time, the space may be effectively cleaned at periodic intervals so as to substantially eliminate sources of infection and contamination to the small pigs during the nursing stage thereof.

It is, therefore, the primary object of this invention to provide improvements in farrowing crates by more effectively positioning a sow in such a crate so as to minimize the risks due to the loss of nursing pigs by reason of the various hazards presented by the sow to the pigs during the nursing stages of the latter.

Another object of the present invention is the provision of a panel assembly for insertion in a conventional farrowing crate in a manner to prevent small pigs from entering the space in which the sow is normally disposed so that the pigs will be isolated from any substantial contact with the sow while the latter may lay on either of its sides or stand without discomfort.

Still another object of the instant invention is the provision of an assembly of the type described which presents the udders of a sow to the nursing pigs while the latter are prevented from any substantial contact with the sow itself, whereby the pigs may readily feed from the sow while being prevented from entering the space in which the sow is confined.

A further object of the present invention is the provision of an assembly of the aforesaid character which is adjustable in size so as to fit farrowing crates of different dimensions.

Another object of the instant invention is the provision of an assembly of the above-mentioned type for use in combination with a farrowing crate in a manner to permit the nursing pigs to move to locations on opposed sides of the farrowing crate whereby the pigs may readily feed from the sow when the latter is laying on either of its sides.

Another object of this invention is the provision of a combination farrowing crate and insert assembly which can be readily cleaned to maintain sanitary conditions for the health of nursing pigs while, at the same time, access to the sow may be had for farrowing.

In the drawings:

FIG. 3 is an end elevational view of the farrowing crate and panel assembly;

FIG. 4 is a fragmentary, cross-sectional view of a leg bin forming a part of the panel assembly;

FIG. 5 is a cross-sectional view taken along line 5—5 of FIG. 3;

FIG. 6 is a cross-sectional view taken along line 6—6 of FIG. 5;

FIG. 7 is an enlarged, cross-sectional view taken along line 7—7 of FIG. 1; and

FIG. 8 is an enlarged, fragmentary, end elevational view of a fastener utilized for releasably coupling the panel assembly to the farrowing crate.

The present invention is directed to a farrowing crate having a panel assembly inserted therewithin in a manner such that the nursing openings in the opposed sides of the farrowing crate are partially blocked by side panels of the panel assembly to prevent entrance of small pigs into the animal-confining space defined by the panel assembly and one end of the farrowing crate. Each side panel has an aperture aligned with and adjacent to a corresponding opening and includes yieldable structure across the aperture which blocks access into the space while permitting young pigs to nurse from the udders of a sow confined thereby.

An end panel is hingedly secured to each side panel respectively to effectively enclose the space in which the sow is disposed, as well as to facilitate the movement of a sow into and out of the space. The end panel is sectionalized to permit access to the sow for farrowing and to permit cleaning of the interior of the assembly.

The assembly is adjustable to fit farrowing crates of different sizes. Moreover, the assembly has a configuration and size permitting small pigs to move from side-to-side of the farrowing crate so that the pigs may feed when the sow in the space is laying on either of its sides.

Figure 2:
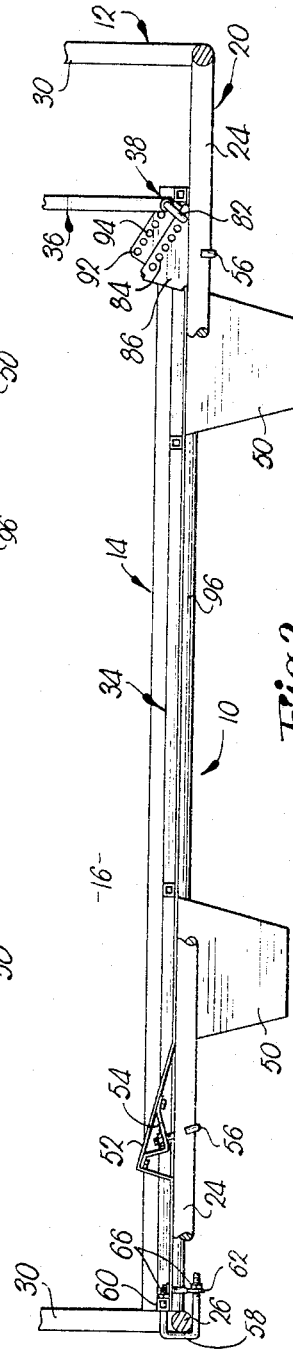
FIG. 2 is a cross-sectional view taken along line 2—2 of FIG. 1.

Apparatus 10 for confining an animal, such as a sow or the like, includes a crate 12 of framework construction in the nature of a conventional farrowing crate, and a panel assembly 14 removably inserted within and releasably coupled to crate 12 for cooperating with the latter in defining an animal-receiving space 16 illustrated in FIG. 2. Crate 12 and assembly 14 are normally disposed on a supporting surface 18, the latter forming the lower boundary of space 16. Surface 18 could well form a part of crate 12; however, it is preferred that crate 12 have an open bottom for simplicity of construction and ease of handling. In this respect, surface 18 is preferably the floor of a building structure which can be readily flushed with a cleaning fluid so that sanitary conditions in and around space 16 may be effectively maintained.

For purposes of illustration, crate 12 includes a pair of spaced sides 20 and an end 22 spanning the distance between proximal extremities of sides 20 as illustrated in FIG. 3. The extremity of crate 12 opposite to end 22 is open so that an animal may move into and out of the interior thereof. The open end is closed in any suitable manner when crate 12 is used conventionally. However, with the use of assembly 14 no closure is required at this open extremity.

Each side 20 includes a pair of longitudinally extending pipes or rods 24 connected to upright pipes 26 at the extremities of crate 12. End 22 includes a plurality of vertically disposed rods 28 spanning the distance between a pair of vertically spaced, normally horizontally disposed crosspieces 30, only one of which is shown in FIG. 3. The spacing of rods 28 is such as to normally prevent nursing pigs from entering crate 12, as well as preventing a sow from moving out of the crate. The lowermost rod 24 of each side 20 respectively, forms with surface 18 an opening 32 which extends the full length of crate 12 to permit access to a portion of an animal confined therewithin. Specifically, opening 32 permits young pigs to feed from the udders of a sow laying on its side on surface 18 within crate 12 when the latter is used conventionally. The spacing between surface 18 and the lowermost rod 24 is such as to normally permit access into crate 12 of nursing pigs. Assembly 14 is provided to prevent movement of small pigs into space 16, yet provides means whereby the pigs may nurse when a sow is laying on either of its sides.

Figure 1:
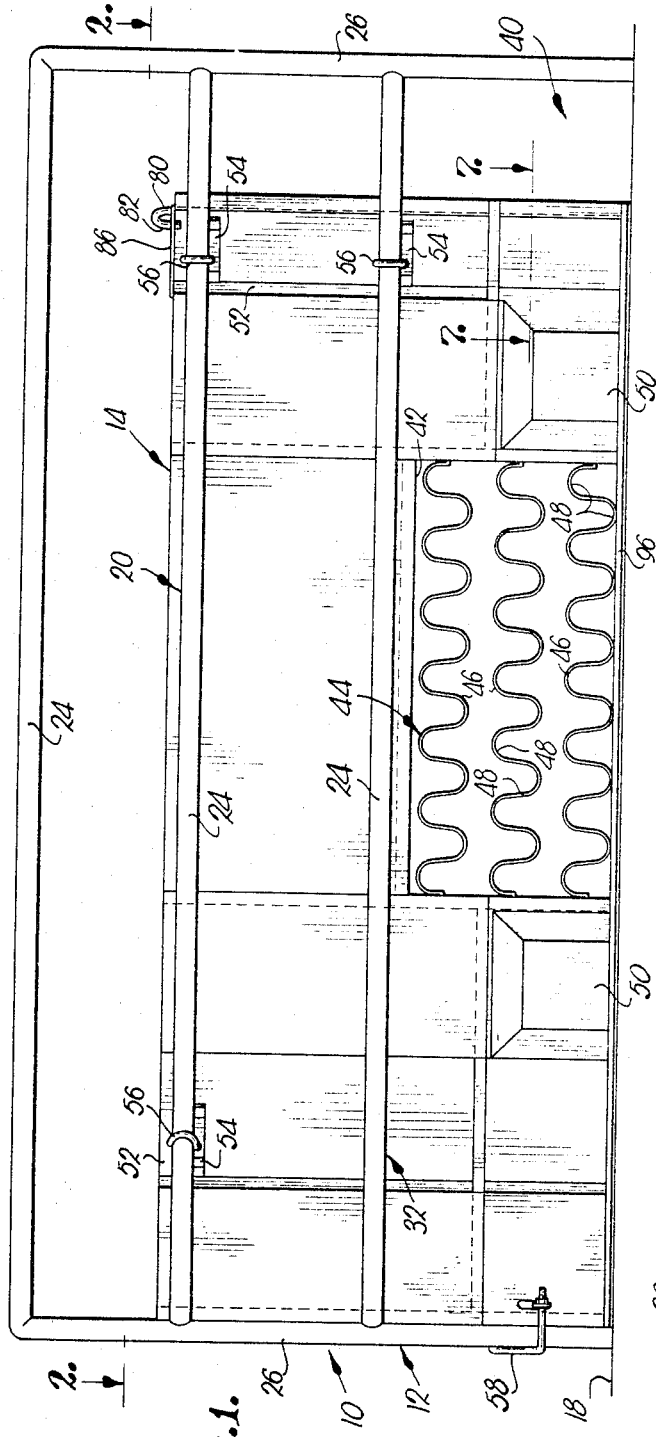
FIGURE 1 is a side elevational view of a farrowing crate showing the instant panel assembly coupled therewith.

Assembly 14 includes a pair of spaced, substantially identical side panels 34, an end panel 36 normally spanning the distance between side panels 34 at the extremities of the latter opposite to the extremities thereof adjacent to end 22 and adjustable hinge means 38 for pivotally mounting end panel 36 on each side panel 34 respectively in a manner to selectively control the spacing between side panels 34. Assembly 14 is of a length preferably less than the length of crate 12 so as to define a passage 40 between sides 20 and extending through openings 32 as shown in FIGS. 1 and 2. Passage 40 allows nursing pigs to move to locations on opposed sides of crate 12 whereby the pigs may feed from either side of crate 12.

Each side panel 34 is in close proximity to the corresponding side 20 as shown in FIG. 2 and has an aperture 42 aligned with and adjacent to the corresponding opening 32. Side panel 34 is generally imperforate so as to block part of its corresponding opening in the manner shown in FIG. 1. Although side panel 34 is shown as being generally imperforate except for the presence of aperture 42, it is to be understood that side panel 34 may be of any construction as long at it bars entrance into space 16 through the blocked parts of the corresponding opening 32.

Structure 44 is disposed across each aperture 42 to reduce the effective cross-sectional area of the same. Structure 44 includes a plurality of vertically spaced springs 46 which yield, by virtue of their resilience, in different directions. Normally, springs 46 are disposed in the plane of the corresponding aperture 42 and are generally movable laterally of this plane, although each spring 46 could conceivably move in a direction parallel to the plane. Each spring 46 is comprised of a single length of spring material which is configured to define a number of aligned recesses 48 which are alternately open at the top and bottom extremities thereof as illustrated in FIG. 1. Springs 46 present a grill through which small pigs can nurse, yet the springs preclude access beyond the udder of the nursing sow. Springs 46 may deflect to conform to the udder or the back of the sow whichever is adjacent thereto. The size of each recess 48 facilitates the feeding of a small pig from the udder of the sow within space 16.

Each panel 34 is further provided with a pair of spaced, hollow leg bins 50 disposed on opposed sides of the corresponding aperture 42 as illustrated in FIGS. 1 and 2. Bins 50 are open to space 16 and receive the legs of a sow or other animal when the latter is laying on the corresponding one of its sides and when the udder of the animal is aligned with aperture 42. One of the bins 50 is for the front legs of the sow and the other bin is for the rear legs thereof.

Each side panel 34 further includes an offset portion 52 adjacent each end thereof respectively as illustrated in FIGS. 2 and 7. As shown in FIG. 1, a pair of vertically spaced, offset portions 52 are provided at the end of side panel 34 adjacent to end panel 36. Each portion 52 has a bracket 54 thereon for providing an anchor for an adjustable J-bolt 56, bolts 56 being utilized for releasably interconnecting side panel 34 with rods 24 of the corresponding side 20. A U-bolt 58 adjacent to end 22 also releasably secures side panel 34 to the corresponding side 20. One end of bolt 58 is received through an upright, tubular element 60 forming a part of side panel 34, and the other end of bolt 58 is received within an eyelet 62 rigid to one end of a bolt 64 carried by the adjacent pipe 26 as illustrated in FIG. 8. Bolt 58 is releasably secured in place by nuts 66 to facilitate separation of assembly 14 from crate 12.

End panel 36 includes a pair of sections 68 and 70 which are interconnected by a pair of hinges 72 at the junction therebetween as illustrated in FIGS. 3 and 5. Section 70 is swingable about a horizontal axis through hinges 72 relative to section 68 so that access to space 16 may be had for farrowing and cleaning. Pins 74 slidably carried by brackets 76 move vertically into and out of the full-line positions thereof illustrated in FIGS. 3 and 5 to normally prevent upward swinging movement of section 70. An ear 78 on the upper end of each pin 74 facilitates the lifting of the latter to a location permitting swinging of section 70.

Hinge means 38 includes a rod 80 having a curved upper end 32 which is releasably received in any one of the holes 84 in a fixed plate 86 secured to the corresponding side panel 34 at the upper extremity of the adjacent portion 52. Each rod 80 extends downwardly along the transversely C-shaped end portion 88 of section 68 as illustrated in FIGS. 3 and 6. Spaced guides 90, carried by end portions 88, permit vertical movement of rod 80 relative to section 68 so that rod 80 provides a hinge pin at the junction between end panel 36 and the corresponding side panel 34.

A plate 92 having spaced, aligned holes 94 therein is provided for each rod 80, respectively, plates 92 being secured to the inner surface of the corresponding side panel 34 adjacent the lower extremity thereof as illustrated in FIG. 7. Plates 86 and 92 are offset with respect to each other as illustrated in FIG. 2 to accommodate the J-shaped configuration of the corresponding rod 80. The lower end of each rod 80 is releasably received within a corresponding one of the holes 94 so that, when the upper end 82 of rod 80 is received within one of the holes 84, the lower and upper extremities of end panel 36 are releasably coupled to the upper and lower extremities of the corresponding side panel 34.

To change the spacing between side panels 34, rods 80 are moved upwardly through a small distance and out of corresponding holes 84 and 94, whereupon end panel 36 is disconnected from side panels 34 permitting movement of end panel 36 into a new disposition with respect to side panels 34. This is illustrated in FIG. 7 wherein end panel 36 is shown in two locations in dashed lines relative to plate 92. When the desired position of end panel 36 is reached, rods 80 are moved downwardly into the corresponding holes 84 and 94.

Arcuate feet 96 are secured to side panels 34 at spaced locations thereon for maintaining the major portion thereof in spaced relationship above and in close proximity to surface 18. This construction facilitates cleaning of surface 18 while preventing access to space 16 by small animals, such as young pigs or the like.

In use, panel assembly 14 is fitted to crate 12, the latter being preferably in the form of a farrowing crate. Assembly 14 cooperates with end 22 to form an enclosure surrounding space 16 into which an animal, such as a sow or the like, may be moved. To accomplish this, one of the rods 80 is shifted to disconnect end panel 36 from the corresponding side panel 34, thus allowing end panel 36 to swing about the hinge defined by the other rod 80. A sow may then move into space 16 and be effectively confined therewithin without any substantial discomfort. End panel 36 is then moved into its operative position, whereupon the sow in space 16 is confined for limited movement only.

If the sow lies down on either of its sides, its feet will project into a corresponding pair of bins 50 and its udders will be aligned with aperture 42 and accessible to small pigs exteriorly of space 16. The pigs may feed through aperture 42 but are prevented from entering space 16 by springs 46. The back of a sow may engage springs 46 on the opposite side panel 42 without discomfort inasmuch as the springs will yield outwardly or longitudinally of the side panel aganst the force of the back of the sow protruding through the corresponding aperture 42.

Farrowing and cleaning can be accomplished by swinging section 70 upwardly after pins 74 have been elevated a sufficient distance to permit this swinging movement. Apparatus 10 may be utilized with crates 12 of different sizes by adjusting the spacing between side panels 34 in the manner set forth hereinabove. Apparatus 10 is also adjustable with respect to the size of a sow or other animal inasmuch as the effective length, as well as the width of space 16, can be varied without closing passage 40.

More efficient use of auxiliary heating devices during cold weather is possible when utilizing assembly 14 because of heat and draft reflection from side panels 34 and end panel 36. In this way, litter and surface 18 will remain cleaner and drier. The offset portions 52 may continue throughout the height of side panels 34 to encourage and guide the positioning of the legs of a sow into bins 50. In this respect, portions 52 would be angularly disposed with respect to the bins to direct the legs thereinto.

Apparatus 10 provides means for effectively preventing any substantial contact of small pigs with a nursing sow at all times, yet at the same time, allows the interior of apparatus 10 to be readily cleaned at periodic intervals so as to maintain sanitary conditions throughout the nursing period of the small pigs.

Crate 12 and assembly 14 may be formed from lightweight materials so that apparatus 10 may be easily moved from place-to-place.

Having thus described the invention, what is claimed as new and desired to be secured by Letters Patent is:

1. Farrowing apparatus comprising:
   a farrowing crate adapted to receive and confine an animal of a first size therewithin and having a configuration permitting only limited movement of the animal, said crate having an opening normally adjacent to the underside of the confined animal when the latter is in a disposition laying on one of its sides, said opening being of a dimension permitting access into and out of the crate by an animal of a second size smaller than said first size when the confined animal is in said disposition; and
   panel means coupled with said crate in partially blocking relationship to said opening for positioning said underside substantially across at least a portion of the unblocked part of the opening when the confined animal is in said disposition, whereby access into said crate through said opening by the animal of said second size is substantially prevented while said underside is accessible to the last-mentioned animal from a location exteriorly of said crate, said panel means cooperating with said crate to define an animal-receiving space, the panel means being provided with an aperture interconnecting the space and the opening and including structure across said aperture for reducing the effective cross-sectional area thereof.

2. Farrowing apparatus as set forth in claim 1, wherein said structure is yieldable.

3. Farrowing apparatus as set forth in claim 1, wherein said structure includes a number of spaced springs each having a plurality of aligned recesses normally coplanar with said aperture and movable laterally of the plane of the aperture.

4. Farrowing apparatus comprising:
   a farrowing crate having a pair of sides and an end interconnecting said sides, each side having a longitudinally extending opening adjacent to the lower extremity thereof, said crate being adapted to receive and confine a sow between said sides and to position the underside of the sow adjacent to an opening when the sow is laying on a corresponding one of its sides, whereby access to said underside is had through the corresponding opening, said end having means normally preventing a small pig from passing therethrough into said crate;
   a panel assembly removably disposed within said crate and being cooperable with said end to define a sow-receiving space within the crate, said assembly including a pair of spaced, side panels disposed adjacent to respective sides of said crate and having a length less than the length of respective sides, an end panel spanning the distance between the side panels and disposed in inwardly spaced relationship to the extremity of said crate opposite to said end, and adjustable hinge means pivotally mounting said end panel on each side panel respectively for swinging movement relative thereto about a generally vertical axis, said hinge means having structure permitting variations in the distance between said side panels to thereby permit changes in the width of said space, said end panel having a pair of relatively shiftable sections, each side panel being in partially blocking relationship to the opening of the corresponding side and having an aperture aligned with the unblocked part of the opening, the openings of said sides spanning the distance between said end and said opposite extremity of the crate, the interior of said crate and the portions of said openings between said end panel and said opposite extremity defining a passage permitting a small pig to move from one side of said crate to the opposite side thereof;
   a number of vertically spaced springs spanning the distance across the aperture of each side panel respectively, each spring having a plurality of aligned recesses normally coplanar with the corresponding aperture and being movable laterally of the plane of its aperture, said springs normally preventing access into said space by small pigs when the underside of a sow within said space and lying on a corresponding one of its sides is aligned with and extends along a corresponding aperture;
   a pair of longitudinally spaced, hollow leg bins for each side panel respectively, said leg bins extending outwardly from the corresponding side panel and through the blocked part of the corresponding opening, each aperture being between a corresponding pair of leg bins, the latter being adapted to receive the legs of a sow within said space and laying on the corresponding one of its sides; and
   means releasably securing the panel assembly to the crate.

5. Farrowing apparatus comprising:
   a farrowing crate adapted to receive and confine an animal of a first size therewithin and having a configuration permitting only limited movement of the animal, said crate having an opening normally adjacent to the underside of the confined animal when the latter is in a disposition laying on one of its sides, said opening being of a dimension permitting access into and out of the crate by an animal of a second size smaller than said first size when the confined animal is in said disposition; and
   panel means coupled with said crate in partially blocking relationship to said opening for positioning said underside substantially across at least a portion of the unblocked part of the opening when the confined animal is in said disposition, whereby access into said crate through said opening by the animal of said second size is substantially prevented while said underside is accessible to the last-mentioned animal from a location exteriorly of said crate, said crate being provided with a pair of spaced sides and an end interconnecting said side, said panel means being removably disposed within said crate and including a pair of side panels adjacent to respective sides and an end panel interconnecting said side panels, said end panel being disposed adjacent to the extremity of said crate opposite to said end, said panels and said end defining an animal-receiving space.

6. Farrowing apparatus as set forth in claim 5, wherein said opening is disposed in one of said sides, the side panel adjacent to said one side having an aperture aligned with said opening and provided with structure across the aperture for reducing the effective cross-sectional area thereof.

7. Farrowing structure as set forth in claim 5, wherein is provided means releasably securing said side panels to said sides of the crate.

8. Farrowing apparatus as set forth in claim 5, wherein is provided means adjustably securing said end panel to each of said side panels, whereby the distance between said side panels and thereby the width of said space may be varied.

9. Farrowing apparatus as set forth in claim 5 wherein the length of said side panels is less than the length of said sides, said end panel being spaced inwardly from said opposite extremity.

10. Farrowing apparatus as set forth in claim 5, wherein said end panel is hingedly mounted to each side panel for swinging movement about a generally vertical axis.

11. Farrowing apparatus as set forth in claim 5, wherein is provided adjustable hinge means for mounting said end panel on each side panel respectively for swinging movement relative thereto about a generally vertical axis and to permit variations in the distance between said side panels, whereby the width of said space may be varied.

12. Farrowing apparatus as set forth in claim 11, wherein said hinge means for each side panel respectively includes a rod, an upper plate and a lower plate, each plate having a series of holes therein aligned with corresponding holes of the other plate, and guides on one of the panels for mounting the corresponding rod for movement of the ends of the rod into and out of a pair of aligned holes in the upper and lower plates.

13. Farrowing apparatus as set forth in claim 5, wherein said end panel is provided with an upper section, a lower section, and means hingedly interconnecting said upper and lower sections.

References Cited by the Examiner

UNITED STATES PATENTS

| | | | |
|---|---|---|---|
| 523,996 | 8/1894 | Randleman et al. | 119—16 |
| 1,361,660 | 12/1920 | Adix | 119—20 |
| 2,764,127 | 9/1956 | Newman | 119—20 |

SAMUEL KOREN, *Primary Examiner.*

HUGH R. CHAMBLEE, *Examiner.*